United States Patent Office 3,833,702
Patented Sept. 3, 1974

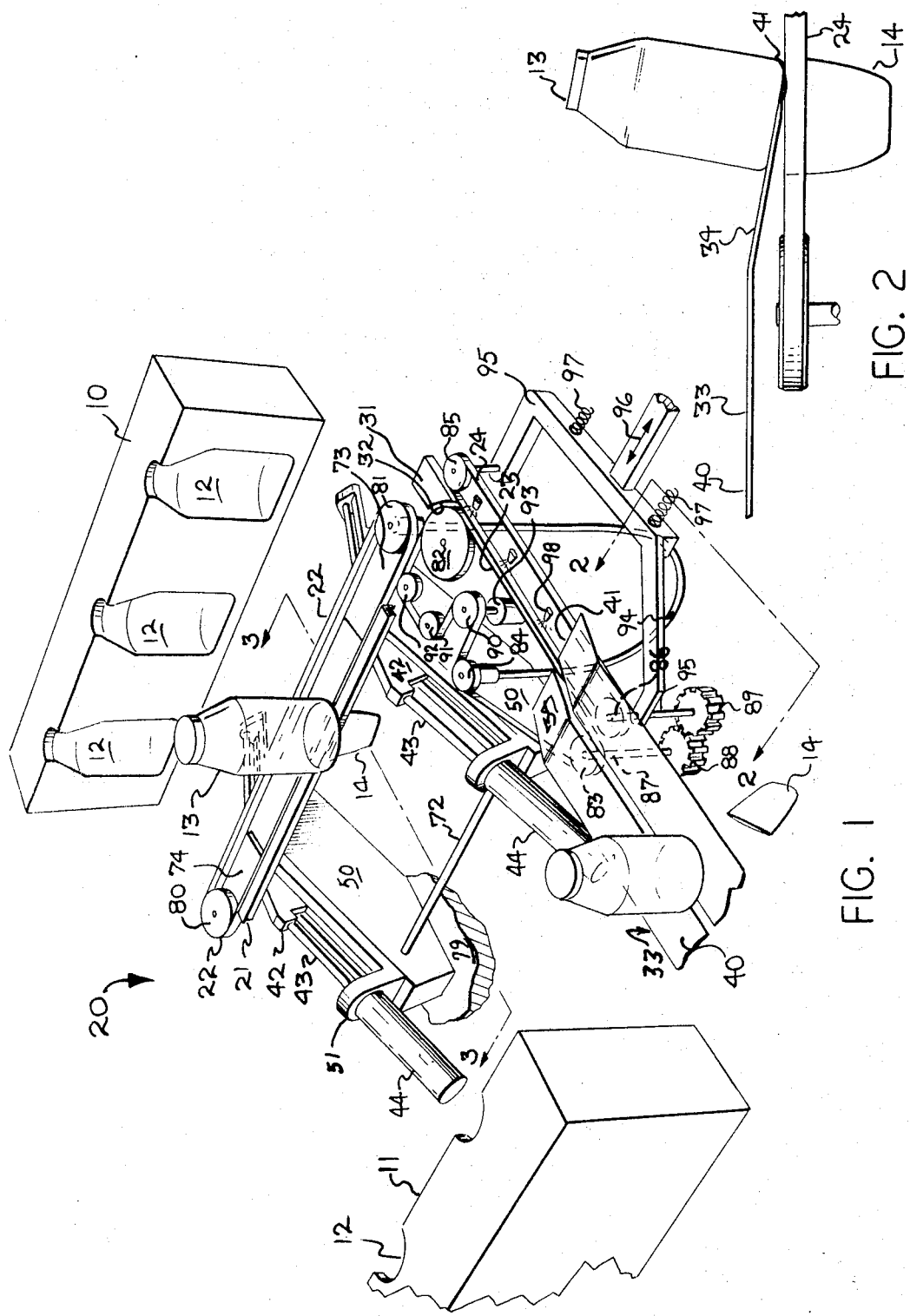

3,833,702
METHOD FOR REMOVING FLASH MATERIAL
FROM BLOWN PLASTIC ARTICLES
Joseph E. Boyer, Warson Woods, Mo., assignor to
Owens-Illinois, Inc., Toledo, Ohio
Original application June 3, 1970, Ser. No. 42,929, now
Patent No. 3,677,454, dated July 18, 1972. Divided
and this application May 17, 1972, Ser. No. 254,182
Int. Cl. B29c 17/12
U.S. Cl. 264—161                   2 Claims

ABSTRACT OF THE DISCLOSURE

The present invention relates to a method for making blown plastic articles such as bottles. A coacting chain and bar mechanism is positioned below the dies of a blow molding machine to facilitate removal of the blown article by grasping the tail portion thereof. Separation of the tail from the blown article is achieved by moving the article up an inclined plane in a direction away from the moving chain.

---

This is a division of application Ser. No. 42,929, filed June 3, 1970, now U.S. Pat. 3,677,454 granted on July 18, 1972.

The present invention relates to the manufacture of plastic blown articles and more particularly to the removal of articles from a forming machine. The present invention also provides for a novel separation of the "tail" portion from the remainder of the finished article.

It is well-known that plastic containers are manufactured to a particular configuration by the pneumatic expansion of a tubular section of plastic material after placement thereof with suitable hollow dies. For example, in the process known as blow molding, a tubular section of plastic material is extruded to the desired length and placed between juxtaposed mold halves, each containing a cavity that conforms to the finished article. The opposing molds are moved toward each other thus confining the previously extruded plastic tubing therebetween.

The end portion of the extruded tube is squeezed between the flat opposing surfaces of the mold halves as they are brought together. The flattened end portion of the tube thus becomes the unwanted tail portion of the bottle.

After the blown articles, which will be hereinafter referred to as containers or bottles, are formed and the mold halves are separated, the tail serves as a means for removing the bottles from the vicinity of the molds.

A rapid removal of the bottles from the mold halves is essential so that production speeds may be maintained.

The mechanism of the present invention involves a movable chain and bar combination that move toward each other to grasp the tails of the bottles as the blow mold is opened. The bottles slide along the bar under the motivating force of the movable chain. Subsequent to removal from the vicinity of the mold, the tail is grasped between two moving chains and the tail is severed from the bottle by the application of a tensile force that exceeds the rupture strength of the plastic material.

The present invention has the following advantages that are inherent in the positive and efficient orientation of the containers. The containers may be picked up as the mold halves open. The containers remain spaced apart one from the other, thus they do not touch or mar one another while in the hot state. By grasping the container at the tail portion only, the entire container is readily adaptable to flame treating, attachment of labels or printed matter, special automatic deflashing around the finish area, and reaming of the opening if necessary. Any secondary operation may be performed with ease since the container is supported and conveyed by the tail portion that is later severed and discarded.

The tensile force necessary for severing the tail from the bottle is provided by causing the bottle to move up an included plane away from the chain while the tail traverses a linear course.

Accordingly, the present invention constitutes an improvement over devices for removing plastic bottles from the mold and severing the tail therefrom. It is, therefore, an object of the present invention to provide an apparatus for rapid removal of containers such as bottles from the confinement of a mold and subsequently remove the tail therefrom.

Another object of the present invention is the provision of a take-out apparatus that insures the stability of the containers as well as providing dwell time to permit the bottles to cool below a deformable temperature.

An additional object of the present invention is the provision of a means of applying a tensile force sufficient to separate the tail from the bottle without damage occurring to the bottle.

A further object of this invention resides in apparatus, so positioned relative to a molding machine, that it is not vulnerable to damage or dislodgement from passing vehicles.

The specific advantages as well as other objects of this invention will become apparent to those skilled in the art from the following detailed description when taken in conjunction with the included drawings, which by way of example, show the preferred embodiment of the invention.

IN THE DRAWINGS

FIG. 1 is a perspective view of a bottle take-out mechanism that shows the relative position of the mechanism to a set of blow mold cavities.

FIG. 2 is a side view looking along lines 2—2 at the inclined plane portion of the apparatus shown in FIG. 1.

Figure 3:
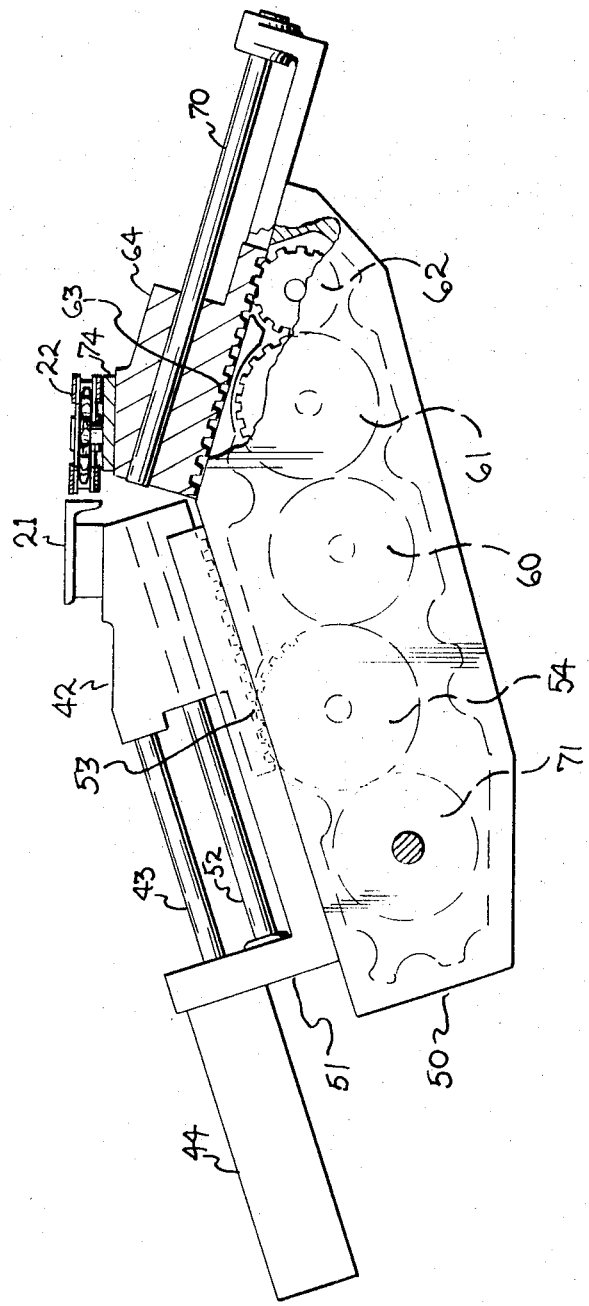
FIG. 3 is a broken away sectional view taken along lines 3—3 of FIG. 1, which shows a gear and rack arrangement for moving the chain and bar toward and away from one another.

The present invention is described and illustrated hereinafter as specifically applying to, for example, bottles or other like containers manufactured from heat deformable plastic material that is extruded or otherwise formed into a parison that is subsequently shaped by fluid pressure to a final configuration within the confinement of a mold.

As shown in FIG. 1, a set of split mold cavity blocks is represented by numerals 10 and 11. Shown within mold cavity blocks 10 and 11 are typical bottle mold cavities 12. Split mold cavity blocks 10 and 11 operate for example in conjunction with a blow mold machine, however, since such machinery is well-known to those skilled in the art, only the mold cavity blocks are illustrated in the drawings. The split mold cavity blocks 10 and 11 move toward and away from each other to form complete mold cavities 12. Thus articles such as bottle 13 can be formed within cavities 12 by the usual blow mold process. Bottle 13 is released from the mold cavity 12 by the heretofore mentioned separation of mold cavity blocks 10 and 11.

Inherent with the manufacture of a bottle by the blow mold process, a portion of the tubular piece of extruded plastic stock material is confined or compressed between the mold cavity blocks 10 and 11 as blocks 10 and 11 are moved to a closed position. The pinching together of the bottom of the generally extruded plastic tubing at the extremity thereof closes the end of the tube thus permitting the bottle to be inflated into conformity with the interior of mold cavity 12. Consequently, the pinched together portion of the plastic tubing remains attached to the finished bottle and is known as a "tail." Tail 14 is shown attached to the bottom of bottle 13 in FIG. 1.

Also shown in FIG. 1 is a bottle take-out and tail reremoving apparatus represented generally at 20. Apparatus 20 is activated after the bottle 13 is formed to final configuration with mold activity 12. Very briefly, apparatus 20 grasps tail 14 of bottle 13 just after mold cavity blocks 10 and 11 are separated for the release of bottle 13. Through the action of apparatus 20, bottle 13 is removed from between mold cavity blocks 10 and 11. Bottle 13 is then transported to a position on the apparatus where the tail is separated from the bottle.

It will be understood that for the purpose of brevity and clarity, much of the support framework and top cover plates associated with apparatus have been omitted from the drawings. A more detailed discussion of apparatus 20 will be set forth in the following paragraphs.

As mold cavity blocks 10 and 11 open, the tail 14 of newly created bottle 13 is grasped between bar 21 and take-out chain 22. Bar 21 and take-out chain 22 are disposed parallel to each other and are equipped to not only move toward and away from each other, but also to move to a position of non-interference with mold cavity blocks 10 and 11. Bar 21 and take-out chain 22 are supported at each end by a movable rack arrangement that will be described more fully in conjunction with FIG. 3.

After bar 21 and take-out chain 22 move toward each other and graps tail 14 therebetween, bottle 13 is entirely supported free from mold cavity blocks 10 and 11. Take-out chain 22 can then be activated and bottle 13 will then be transported to a position clear of mold cavity blocks 10 and 11. The tail 14 slides along the edge of bar 21 under the influence of movable take-out chain 22, the individual links of which penetrate the heat softened tail 14 of bottle 13. It is of course to be understood that bar 21 could be replaced with a chain arrangement that would operate synchronously with chain 22.

Bottle 13 is removed from the confinement of the mold cavity blocks 10 and 11 under the influence of movable take-out chain 22. As bottle 13 traverses the entire length of bar 21, the tail portion 14 thereof is transferred from bar 21 to drive chain 13. Bottle 13 continues to move in a direction away from mold cavity blocks 10 and 11 by the combined translatory action of take-out chain 22 and drive chain 23.

In order to change the direction of travel of bottle 13, drive chain 23 undergoes an angular bend around sprocket 82. At this location take-out chain 22 relieves its graps upon tail 14. Tail 14 and attached bottle 13 are translated through an angular turn under the influence of drive chain 23 and plate 31. Plate 31 has a curvilinear edge 32 that coacts with drive chain 23 to effect the change in direction of bottle 13.

As the desired change in direction of bottle 13 is achieved, tail 14 moves away from the confinement of curvilinear plate edge 32 and is grasped instead by auxiliary chain 24. The combined gripping action of drive chain 23 on the one side of tail 14 and a similar gripping action of auxiliary chain 24 on the other side assures no slippage as tail 14 is separated from bottle 13.

After tail 14 is within the grasp of drive chain 23 and auxiliary chain 24, the tail 14 and attached bottle 13 are translated toward the actual separation mechanism 33. Referring now to FIG. 2, the separation of mechanism 33 consists of a bifurcated inclined plane 34 and platform 40 arrangement. The leading edge 41 of inclined plane 34 is at an elevation such that the beveled edge thereof is lower than the bottom of bottle 13. As bottle 13 traverses, the straight extent where drive chain 23 and auxiliary chain 24 coact, bottle 13 is forced up inclined plane 34 thus severing by rupture the tail 14 from the bottom of bottle 13. Bottle 13 is then moved along platform 40 under the biasing action of susequent bottles 13 that have been also guided up inclined plane 33 during tail separation. The separated tail 14 is released from the confinement of chains 23 and 24 as they reach the extent of their travel.

Referring once again to FIG. 1, bar 21 is supported near each end by drive racks 42. Drive racks 42 are attached to the ends of actuator rods 43. Actuator rods 43 are coupled with actuators 44 which are in turn mounted on gear housings 50 by actuator support brackets 51. Drive racks 42 are stabilized by support rods 52 which can be best seen in FIG. 3. Rods 52 are anchored at an end to actuator support bracket 51. Thus it can be seen in FIG. 3 that drive rack 42 is free to move up and down support rod 52 as actuator rod 43 is moved in and out under the influence of actuator 44. Actuator 44 is of normal construction and may be powered by any well-known hydraulic or pneumatic means.

Referring also to FIG. 3 it can be seen that a plurality of gears are supported within the housing 50. The purpose of the gear housing will now be explained. As heretofore commented upon, it is desirable that bar 21 and take-out chain 22 move toward and away from each other thus providing a gripping action for grasping the tails 14 of bottles 13. The teeth 53 on the bottom of rack 42 engage with gear 54 thus causing it to rotate. The rotation of gear 54 causes gears 60, 61 and 62 to rotate in alternate angular directions. Gear 62 is meshed with teeth 63 of slave rack 64. Slave rack 64 then moves back and forth along rod 70 which stabilizes and supports it.

Thus it becomes evident that as actuator 44 is powered, drive rack 42 will move either toward or away from actuator 44. Slave rack 64 will, because of the just described gear arrangement, move in a direction opposite to drive rack 42. Since takeout chain 22 is attached to slave rack 64 and since bar 21 is attached to drive rack 42, the two will open and close according to the direction of movement of actuator rod 43.

Also shown within gear housings 50 are gears 71 which mesh with the teeth of gears 54. Gears 71 are interconnected one with the other by common shaft 72. By interconnecting gears 71 with shaft 72, both gears must rotate at the same time. This common rotation produces a stabilizing effect upon the movement of actuators 44. Even though actuators 44 are interconnected to the same fluid power source, one may move more rapidly than the other thus causing bar 21 and take-out chain 22 to open or close more rapidly on one end than the other. The interconnection of gears 71 assures an even movement of both actuators 44.

In order to provide for the full extent of take-out chain 22, it is mounted from support plates 73 and 74 which are respectively cantilevered from the top portions of slave racks 64. Take-out chain 22 is trained over idling sprocket 80 which is anchored to the free end of cantilevered support plate 74. The opposite extent of take-out chain 22 is trained over secondary drive sprocket 81. Drive sprocket 81 is spindled for rotation at the extremity of cantilevered support plate 73. Drive sprocket 81 is powered by a drive shaft that extends through plate 73.

From the aforegoing discussion, it becomes evident that bar 21 and take-out chain 22 can, not only move toward and away from each other, but also they move up and down the inclined rods 52 and 70 so that there will be no interference with the opening and closing of mold cavity blocks 10 and 11.

Referring once again to FIG. 1, drive chain 23 is trained over sprocket 82 which is positioned adjacent plate 31. Drive chain 23 travels over an extent that is parallel to auxiliary chain 24. A sprocket 83 coacts with sprocket 82 to define the straight extent of drive chain 23 as it parallels auxiliary chain 24. Drive chain 23 continues from sprocket 83 to primary drive sprocket 84. After traversing around a portion of primary drive sprocket 84, drive chain 23 encompasses power sprocket 90. From engagement with power sprocket 90 drive chain 23 passes around idler sprockets 91 and 92. After passing around sprocket 92, drive chain 23 completes its closed loop with sprocket 82 previously mentioned.

Power is delivered to chains 22, 23 and 24 through power sprocket 90 which in turn is coupled by means of a direct line drive shaft to motor 93. Primary drive sprocket 84 is attached to a preferably flexible drive shaft 94. Flexible drive shaft 94 receives its power from drive chain 23 and primary drive sprocket 84. Drive shaft 94 delivers its power to secondary drive sprocket 81, thus powering take-out chain 22. In a similar manner it would be possible to couple a flexible drive shaft to, for example, sprocket 91 and drive synchronously the heretofore mentioned chain replacement for bar 21.

Auxiliary chain 24 is trained over two sprockets 85 and 86. Sprocket 83, which is associated with drive chain 23 is mounted in a rigid manner to shaft 87. Shaft 87 contains gear 88 on the end thereof. Gear 88 meshes with gear 89. Gear 89 it attached to shaft 95 and shaft 95 is rigidly coupled to sprocket 86.

Thus it can be seen that take-out chain 22 and auxiliary chain 24 move only when drive chain 23 is powered.

Very briefly, the heretofore described apparatus operates in the following manner. The entire structure is mounted from a blow mold machine which for convenience has not been shown in the drawings except at 79. When mold cavity blocks 10 and 11 are in the closed position, bar 21 and take-out chain 22 have been moved to a position away from each other. Bar 21 and chain 22 are at the lower extent of rods 52 and 70, thus they are free from interference with the bottom of mold cavity blocks 10 and 11. As mold cavity blocks 10 and 11 are moved away from each other to release bottle 13 from mold cavity 12, fluid power is supplied to actuators 44 thus causing bar 21 and take-out chain 22 to move upward and toward each other. Their movement is synchronized so that they come together and grasp tail 14 of bottle 13 as mold cavity blocks 10 and 11 clear take-out mechanism 20.

Motor 93 is then activated to set drive chain 23 in motion. Drive chain 23 causes primary drive sprocket 84 to rotate thus delivering a rotational force to secondary sprocket 81 via flexible drive shaft 94. Bottles 13 are then removed from the vicinity of the mold cavity blocks and parked along the parallel extent between drive chain 23 and auxiliary chain 24. If desired at this location, additional operations such as flame treatment, deflashing, etc. can be performed. Bar 21 and take-out chain 22 are retracted to an outward and downward position. The blow mold machine is then ready to commence another molding cycle.

Since the newly formed bottles 13 are quite deformable when hot, they are held for cooling just prior to the removal of the tails 14 therefrom. The bottles 13 can be held between drive chain 23 and auxiliary chain 24 until the bolw mold machine is ready to release another set of newly formed bottles. When desired and according to the temperature of bottles 13, drive chain 23 can be set in motion and bottles 13 can be advanced one at a time up inclined plane 34 thus causing tail 14 to be pulled from the bottom of each bottle 13. The severed tail travels beneath platform 40 to the end of the common extent of drive chain 23 and auxiliary chain 24 where it is permitted to fall free from the grasp of the chains. Bottles 13 are pushed one at a time up inclined plane 34 and across the horizontal extent of platform 40. Bottles 13 may then be deposited in appropriate bins or conveyors for subsequent packing or filling.

To further increase the versatility of the present invention, it is often found desirable to release or control the amount of compressive force that is applied to the tails 14 of bottles 13. FIG. 1 shows a support system for auxiliary chain 24 whereby chain 24 can be moved away from drive chain 23. A common support system or yoke 95 is interconnected to the support shafts that carry sprocket 85 and sprocket 86. By moving yoke 95 along the direction indicated by arrow 96, the compressive force between chains 23 and 24 can be relieved. Also at the same time the power to auxiliary chain 24 can be disconnected by the separation of gears 88 and 89. Yoke 95 can be arranged by springs such as 97 so that a constant pressure is exerted upon tails 14 as they traverse the extent between chains 23 and 24.

There are certain occasions when it is desirable to increase the rigidity of the plastic tails prior to their separation. Also the strength of the bottles can be controlled so that the bottoms thereof do not pull out upon tail separation. This extra thermal conditioning is achieved through the application of cooling air such as supplied by air jets 98.

Thus, it can be determined from the aforetodescribed invention that an improved apparatus has been created for the removal of tails from bottles and like articles.

What is claimed is:

1. The method of removing blow molded plastic bottles with waste portions attached thereto from a split cavity molding machine and thereafter separating the waste portion from the bottom of the bottle including the steps of;
   (a) grasping the waste portion of the bottle while the bottle is in an upright position as it is released from a mold cavity,
   (b) translating said bottle from between the parted mold cavities by clamping the waste portion against a bar and sliding said waste portion in a linear direction along the surface of the bar while holding the waste portion by chain means,
   (c) transferring said bottle from said bar and chain clamping arrangement to a position where the waste portion is clamped on both sides thereof by chain means, and
   (d) moving the bottle up an inclined plane in a direction away from the direction of travel of the waste portion thus severing the bottle from the waste portion.

2. The method of removing blow molded plastic bottles with waste portions attached thereto from a split cavity molding machine and thereafter separating the waste portion from the bottom of the bottle including the steps of;
   (a) grasping the waste portion of the bottle while the bottle is in an upright position as it is released from a mold cavity,
   (b) translating said bottle from between the parted mold cavities by clamping the waste portion between a bar and a chain and sliding the waste portion in a linear direction along the surface of the bar while holding the waste portion by chain means,
   (c) transferring said bottle from said bar and chain clamping arrangement to a position where the waste portion is claimped on both sides thereof by chain means,
   (d) holding the bottle in an upright position until the bottles have undergone a reduction in temperature, and
   (e) advancing the bottle up an inclined plane is a direction away from the linear direction of travel of the waste portion thus causing a severing of the bottle from the waste portion.

References Cited
UNITED STATES PATENTS

| | | | |
|---|---|---|---|
| 3,464,084 | 9/1969 | Thompson | 83—914 X |
| 3,098,593 | 7/1963 | Heider | 225—99 X |
| 3,608,037 | 9/1971 | Genz | 264—161 |
| 3,040,376 | 6/1962 | Elphee | 264—161 |
| 3,172,152 | 3/1965 | Uhlig | 264—161 X |

ROBERT F. WHITE, Primary Examiner

T. E. BALHOFF, Assistant Examiner